Aug. 28, 1923.
T. H. KING
WATER PIPE
Filed April 14, 1922
1,466,592
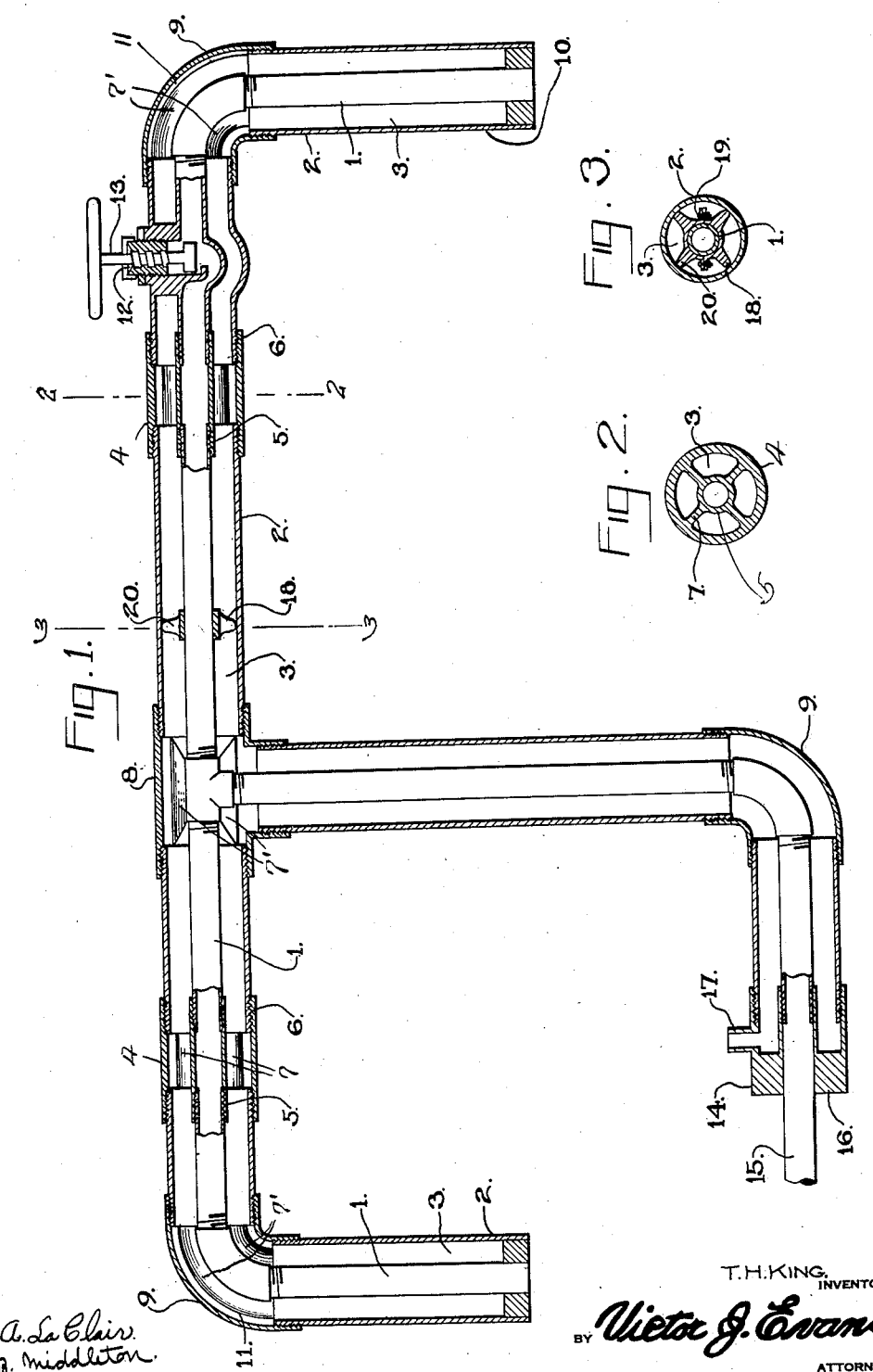
T. H. KING, INVENTOR
BY *Victor J. Evans*
ATTORNEY Patented Aug. 28, 1923.

1,466,592

UNITED STATES PATENT OFFICE.

THOMAS H. KING, OF CHARLOTTE, NORTH CAROLINA.

WATER PIPE.

Application filed April 14, 1922. Serial No. 552,446.

*To all whom it may concern:*

Be it known that I, THOMAS H. KING, a citizen of the United States, residing at Charlotte, in the county of Mecklenburg and State of North Carolina, have invented new and useful Improvements in Water Pipes, of which the following is a specification.

This invention relates to water systems for dwellings and the like, the general object of the invention being to provide means for preventing the system from freezing in cold weather by providing an air space around the pipes by enclosing the water pipes by larger pipes and drawing the air from the space between the pipes.

Another object of the invention is to provide means whereby the air can be drawn from the entire system at one point.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a diagrammatic view showing a system constructed in accordance with my invention.

Figure 2 is a sectional view taken on line 2—2 of Figure 1.

Figure 3 is a sectional view taken on line 3—3 of Figure 1.

As shown in these views all the water pipes 1 are placed in larger pipes 2 so that a space 3 is left between the pipes. The couplings 4 are formed with inner parts 5 and outer parts 6 which are connected together by the ribs 7. The inner parts are threaded to receive the ends of the pipe 1 while the outer parts are threaded to receive the pipes 2. The T-couplings 8 and the elbows 9 are also formed of inner and outer parts connected together by ribs 7′ so as to form continuations of the water and air spaces and the faucet 10 is also formed of inner and outer parts to provide the air spaces 11 which are connected with the air spaces 3 of the pipes and couplings. Suitable packing glands 12 are provided on the valve of the faucet for preventing leakage around the handle 13 of the faucet. The air spaces are closed at the ends of the faucet and a special form of coupling 14 is used for connecting the system with the water main 15. This coupling has its air space closed at one end, as shown at 16, so that air cannot enter the air space of the system. This coupling is also provided with a nipple 17 which is adapted to receive a suction pump or the like so that the air can be drawn from the air spaces 3 of the entire system. I may also provide supports 18 for the water pipes where such pipes are of great length. These supports are formed in sections so that they can be placed in the pipes 1, the sections being fastened together by the bolts 19. Each section is provided with a number of projections 20 which have their ends engaging the inner walls of the pipes 2. These supports are preferably made of hard rubber.

From the above it will be seen that the entire system is surrounded by the space from which the air has been drawn so that the water system will be prevented from freezing in cold weather. The pipes used can be ordinary pipes, the couplings, elbows and spigots being of special construction.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A water system of the character described comprising a series of inner and outer pipes, straight couplings composed of inner and outer parts of equal length having screw threaded ends for attachment to the said inner and outer pipes, spaced ribs connecting the inner and outer parts extending longitudinally betwen the screw threaded ends, T-couplings composed of inner and outer parts connected together by spaced ribs, elbow couplings composed of inner and outer parts connected together by longitudinally curved spaced ribs, plugs closing the ends of the space between the inner and outer pipes at their discharge ends, means for permitting the air to be withdrawn from the space between the inner and outer pipes, such means comprising a coupling having screw threaded inner and outer parts at one end for attachment to the inner and outer parts, said coupling having the space between the inner and outer parts closed at the other end which has a screw threaded opening to receive an inlet pipe, and a nipple on said coupling communicating with the space between the inner and outer pipes adapted to be attached to an air pump to withdraw the air from said space throughout the system.

2. A water system of the character described comprising a series of inner and outer pipes, supports mounted within the outer pipes embracing the inner pipes, couplings composed of inner and outer parts connected together by longitudinally extending spaced ribs, a faucet composed of inner and outer spaced parts, said faucet having an airtight passage between the inner and outer parts for a valve which controls the flow of water in the inner pipe, means for permitting the air to be withdrawn from betwen the inner aad outer parts of the system, said means consisting of a coupling composed of inner and outer parts at one end for attachment to the inner and outer pipes, said coupling having the space between the inner and outer parts closed at its other end and having an opening therein for a water supply pipe, and a nipple on said coupling adapted to be attached to an air pump to withdraw the air from the space between the inner and outer parts of the system.

In testimony whereof I affix my signature.

THOMAS H. KING.